(12) United States Patent
Koontz et al.

(10) Patent No.: US 6,571,658 B2
(45) Date of Patent: Jun. 3, 2003

(54) C-SHAPED PIN-CONNECTOR WITH RETAINING RAMP

(75) Inventors: Harry Edward Koontz, Dearborn, MI (US); Joseph Matthew Laperriere, III, Chesterfield Township, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 16 days.

(21) Appl. No.: 09/901,208

(22) Filed: Jul. 9, 2001

(65) Prior Publication Data

US 2003/0005789 A1 Jan. 9, 2003

(51) Int. Cl.[7] .............................................. F16C 1/10
(52) U.S. Cl. ................................................... 74/502.4
(58) Field of Search ............................ 74/502.4, 502.6; 403/112, 113, 164, 165, 321, 322.1, 322.3, 324

(56) References Cited

U.S. PATENT DOCUMENTS

| | | | |
|---|---|---|---|
| 3,626,429 A | 12/1971 | Toder | 16/87.2 |
| 4,790,206 A | 12/1988 | Thomas | 74/502.4 |
| 4,847,973 A | 7/1989 | Lundeen | 29/402.08 |
| 5,106,223 A | 4/1992 | Kraus | 403/11 |
| 5,201,858 A | 4/1993 | Otrusina | 24/597 |
| 5,295,408 A | 3/1994 | Nagle et al. | 74/502.6 |
| 5,447,745 A | 9/1995 | Descamps | 427/8 |
| 5,522,276 A | * 6/1996 | Lichtenberg | 74/500.5 |
| 5,575,180 A | * 11/1996 | Simon | 403/329 |
| 5,615,583 A | 4/1997 | Cunningham et al. | 74/502.4 |
| 6,098,489 A | * 8/2000 | Van Zanten et al. | 403/155 |
| 6,109,132 A | * 8/2000 | Frye | 74/501.5 R |

* cited by examiner

Primary Examiner—David A. Bucci
Assistant Examiner—Vicky A. Johnson
(74) Attorney, Agent, or Firm—Howard & Howard

(57) ABSTRACT

A connector (26) connects a disc-shaped head (22) supported on a post (24). The connector (26) presents a surface (28) and a flange (30) is spaced and parallel to the surface (28) to define a pocket between the surface (28) and the flange (30) for receiving the disc-shaped head. The connector is characterized by a catch (40) extending upwardly a beam (48) forwardly of the circular opening (32) for allowing insertion of the head (22) into the pocket and for retaining the head (22) in the pocket. The catch (40) includes an inclined ramp (46) extending downwardly and forwardly from the top (44) of a retaining shoulder (42). A slot (50) extends around the beam (48) for allowing the beam (48) to flex.

4 Claims, 3 Drawing Sheets

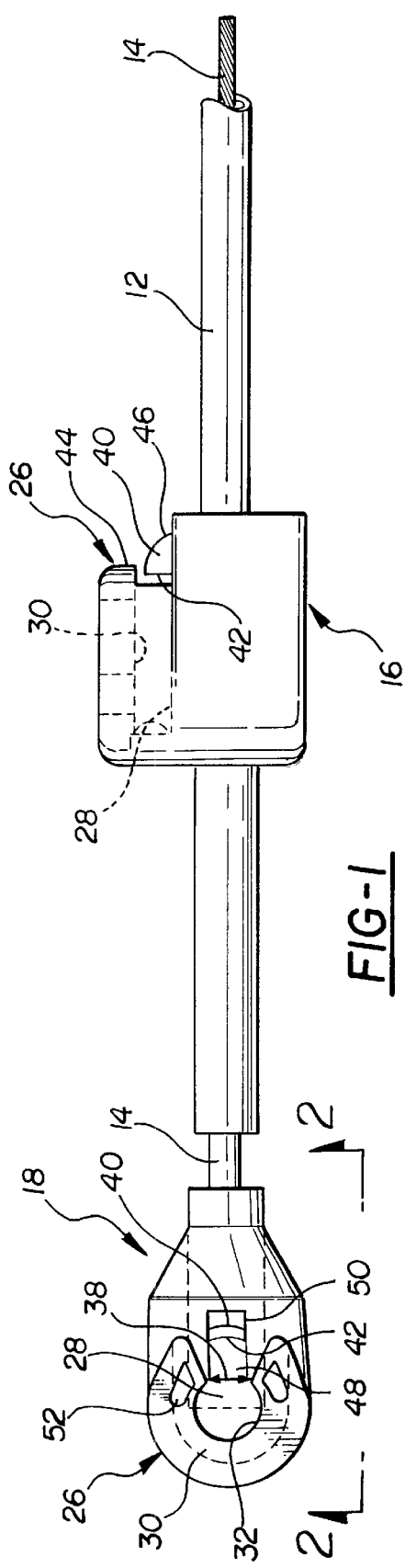
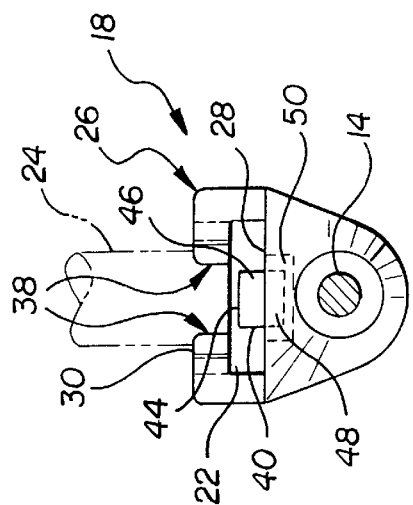
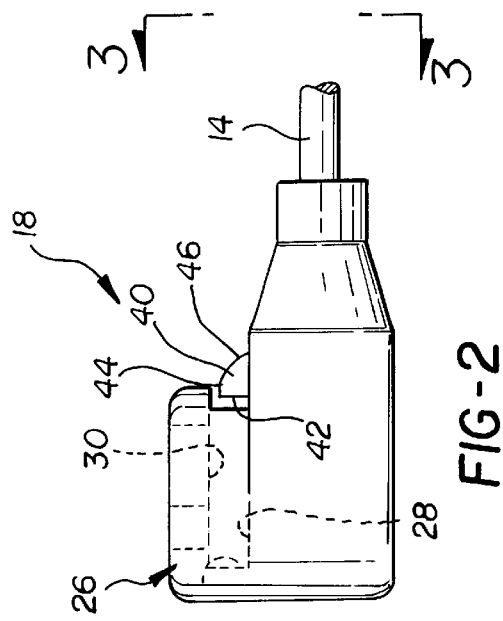

C-SHAPED PIN-CONNECTOR WITH RETAINING RAMP

BACKGROUND OF THE INVENTION

1. Field of the Invention

The invention relates to a motion transmitting remote control assembly having a support for connection to support structure and a flexible motion transmitting core element having a terminal for transmitting motion in a curved path, and, more specifically, to a connector for connecting either the support or the terminal to a disc shaped head supported on a post.

2. Description of the Prior Art

The motion transmitting remote control assemblies of the type to which this invention pertains are well known and comprise a conduit supporting a motion transmitting core element. A terminal connects the core element to a control member and a support supports the conduit on a support structure. Such assemblies are frequently used in automotive vehicles to transmit rectilinear motion from the vehicle operator to various systems and accessories in the vehicle.

Either or both of the terminal and the support may utilize a known connector for connection to a disc-shaped head supported on a post. Such a connector is disclosed in U.S. Pat. No. 5,615,583 to Cunningham et al and assigned to the assignee of the subject invention, as well as in U.S. Pat. No. 4,790,206 to Thomas and U.S. Pat. No. 5,295,408 to Nagle et al. This connector presents a surface and a flange spaced and parallel to the surface to define a pocket between the surface and the flange for receiving the disc-shaped head with the flange defining a circular opening for surrounding the post and an entrance more narrow than the circular opening for retaining the post in the circular opening.

This connector performs very well but there are installations where the forces urging the connector to separate from the head on the post are very high. The subject invention provides an alternative configuration to be used in those situations requiring retention forces that are in high a range.

SUMMARY OF THE INVENTION AND ADVANTAGES

Accordingly, the subject invention provides a motion transmitting remote control assembly of the well known type comprising a motion transmitting core element movably supported in a conduit with a terminal for connecting the core element to a control member and a support for supporting the conduit on a support structure. The invention is more specifically directed to the known connector extending from one of the terminal and the support for connection to a disc-shaped head supported on a post. Such a connector presents a surface and a flange spaced and parallel to the surface to define a pocket between the surface and the flange for receiving the disc-shaped head with the flange defining a circular opening for surrounding the post and an entrance more narrow than the circular opening for retaining the post in the circular opening. The invention in the assembly is characterized by a catch extending upwardly of the surface forwardly of the circular opening for allowing insertion of the head into the pocket and for retaining the head in the pocket.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a view showing the invention incorporated into both a terminal on a core element a conduit support of a motion transmitting assembly;

FIG. 2 is a side view taken along line 2—2 of FIG. 1;

FIG. 3 is an end view taken along line 3—3 of FIG. 2;

DETAILED DESCRIPTION OF THE PREFERRED EMBODIMENT

Figure 4:
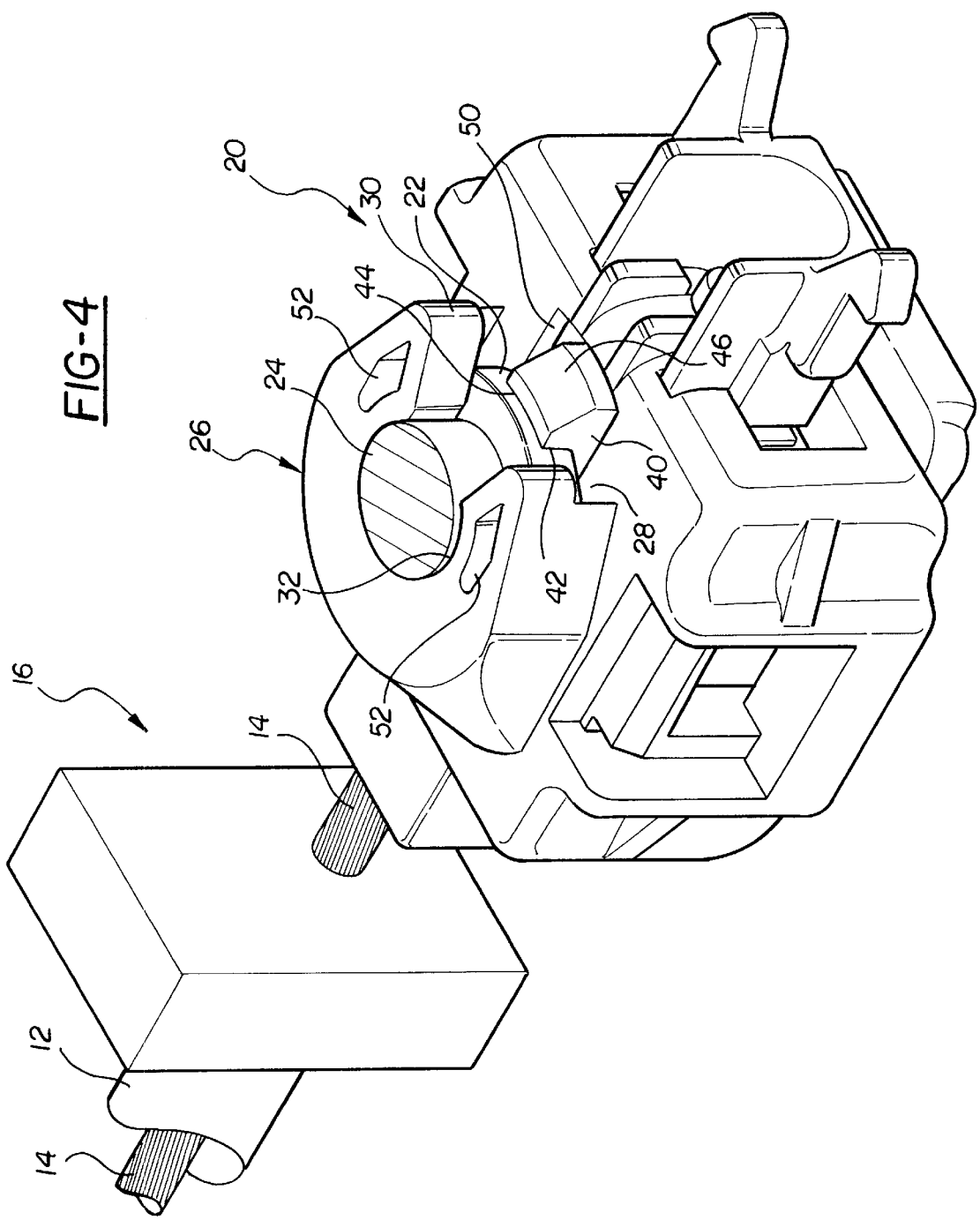
FIG. 4 is a perspective view showing the invention incorporated into a different terminal on a core element of a motion transmitting assembly.
Figure 5:
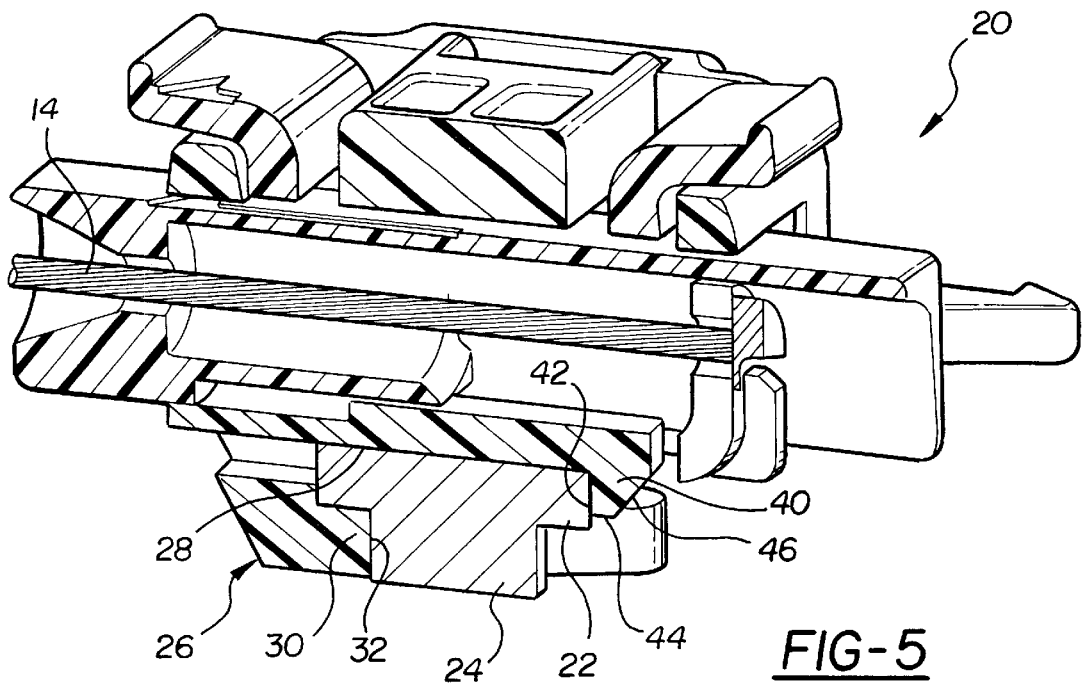
FIG. 5 is a perspective view in cross section of the embodiment of FIG. 4.
Figure 6:
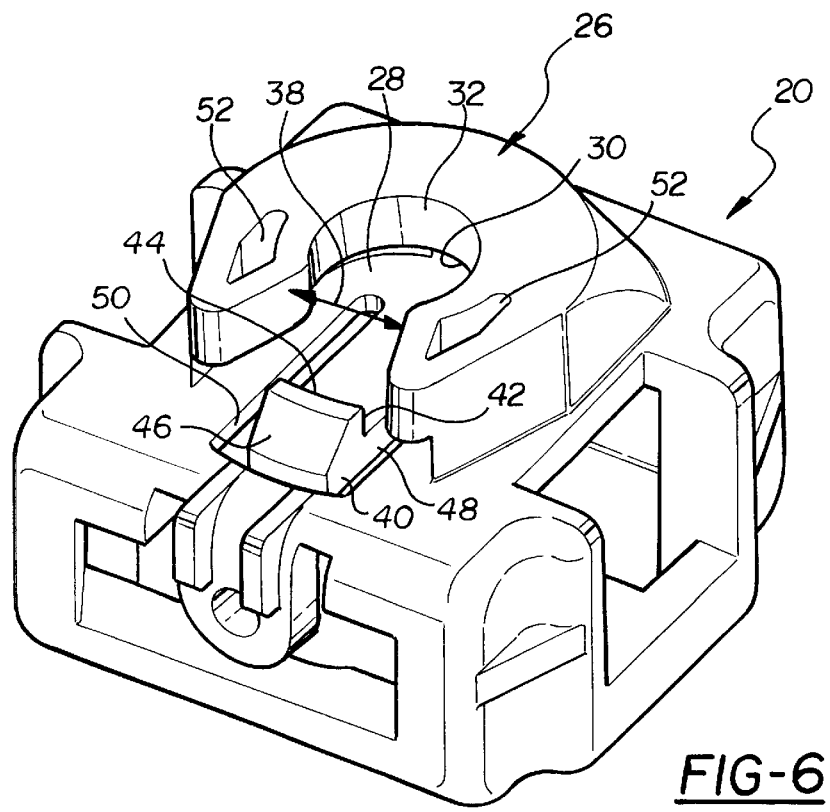
FIG. 6 is a perspective view of the embodiment of FIG. 4 but from the opposite side and without the remainder of the assembly.

Referring to the Figures, wherein like numerals indicate like or corresponding parts throughout the several views, a motion transmitting remote control assembly incorporating the invention pertains is shown in a first embodiment in FIGS. 1–3 and in a second embodiment in FIGS. 4–6.

Both embodiments comprise a conduit 12 supporting a motion transmitting core element 14 movably supported in the conduit 12. The conduit may be of the type well known in art and including an inner tubular made of plastic and surrounded by a plurality of tension bearing long lay wires or filaments helically disposed on a long lead and surrounded by a casing of plastic. A support, generally shown at 16, is included for supporting the conduit 12 on a support structure, such as a vehicle (not shown). The support 16 is molded of plastic and bonded to the conduit for supporting the assembly to a part of the vehicle structure.

Each embodiment includes a terminal for connecting the core element 14 to a control member, such a terminal being generally shown at 18 in FIGS. 1–3 and generally shown at 20 in FIGS. 4–6.

Both of the support 16 and the terminals 18 and 20 are configured to engage a disc-shaped head 22 supported on a post 24, as shown in FIGS. 3–5. As will be appreciated, each of the terminal 18, 20 and the support 16 may take various configurations and incorporate the connector of the subject invention. The embodiment of FIGS. 4–6 is shown combined with a core element terminal having an adjustment feature, an adjustment feature of the type disclosed in U.S. Pat. No. 5,477,745 to Boike et al and Ser. No. 08/889,872 filed Jul. 8, 1997 in the name of Malone, both of which are assigned to the assignee of the subject invention. It will be appreciated that the subject invention may be combined with a multitude of terminal and support configurations.

The well-known connector, generally indicated at 26, extends from at least one of the terminal 18, 20 and the support 16 for connection to the disc-shaped head 22 supported on the post 24. In the embodiments shown the connector 26 extends from the terminal 18, 20 as well as the support 16. The connector 26 presents a surface 28 and a flange 30 is spaced and parallel to the surface 28 to define a pocket between the surface 28 and the flange 30 for receiving the disc-shaped head 22 with the flange 30 defining a circular opening 32 for surrounding the post 24 and an entrance 38 more narrow than the circular opening 32 for retaining the post 24 in the circular opening 32.

The connector of the assembly is characterized by a catch 40 extending upwardly of the surface 28 forwardly of the circular opening 32 for allowing insertion of the head 22 into the pocket and for retaining the head 22 in the pocket. The catch 40 includes a shoulder 42 extending upwardly to a top 44 for retaining the head 22 in the pocket. The catch 40 includes an inclined ramp 46 extending downwardly and forwardly from the top 44 of the shoulder 42.

The catch 40 is movable downwardly for facilitating insertion of the head 22 into the pocket. More specifically, the connector 26 includes a cantilevered beam 48 connected to the connector 26 and flexible about the connection of the beam 48 to the connector 26, and the catch 40 being supported on the beam 48. The catch 40 is disposed at the distal end of the beam 48. A slot 50 extends around the beam 48 for allowing the beam 48 to flex relative to the connector 26. Actually, the slot may be formed in the molding of the connector by forming a cavity into the surface 28 in the manner of an open box surrounding the beam 48. The cavities or holes 52 in the upper surface of the flange 30 provide flexibility and are disclosed and claimed in the aforementioned U.S. Pat. No. 5,615,583.

As the connector 26 is mounted on the head 22, the post 24 moves through the narrow enclosure 38 as the head 26 engages and moves over the ramp 46. The catch 40 is either short enough for the head 22 to move thereover or is flexible, as shown, to allow the head 22 to move into the pocket under the flange 30. Once the head 22 is in the pocket under the flange 30, the head is retained therein by snapping behind the shoulder 42 of the catch 40. The catch provides a positive lock to retain the head 22 engaged with the connector 26.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A motion transmitting remote control assembly comprising;

a conduit (12), a motion transmitting core element (14) movably supported in said conduit (12), a terminal (18, 20) for connecting said core element (14) to a control member, a support (16) for supporting said conduit (12) on a support structure, a connector (26) extending from one of said terminal (18, 20) and said support (16) for connection to a disc-shaped head (22) supported on a post (24), said connector (26) presenting a surface (28) and a flange (30) spaced and parallel to said surface (28) to define a pocket between said surface (28) and said flange (30) for receiving the disc-shaped head (22) with said flange (30) defining a circular opening (32) for surrounding the post (24) and an entrance (38) more narrow than said circular opening (32) for retaining the post (24) in said circular opening (32), a catch (40) extending upwardly of said surface (28) forwardly of said circular opening (32) for allowing insertion of the head (22) into said pocket and for retaining the head (22) in said pocket, said connector (26) including a cantilevered beam (48) connected to said connector (26) and extending to a distal end and flexible about the connection of said beam (48) to said connector (26), and said catch (40) being disposed on said distal end of said beam (48).

2. An assembly as set forth in claim 1 wherein said catch (40) includes a shoulder (42) extending upwardly to a top (44) for retaining the head (22) in said pocket.

3. An assembly as set forth in claim 2 wherein said catch (40) includes an inclined ramp (46) extending downwardly and forwardly from the top (44) of said shoulder (42).

4. An assembly as set forth in claim 1 wherein said connector (26) includes a slot (50) extending around said beam (48) for allowing said beam (48) to flex relative to said connector (26).

* * * * *